(12) United States Patent
Eikhoff

(10) Patent No.: US 6,209,204 B1
(45) Date of Patent: Apr. 3, 2001

(54) METHOD FOR SECURING A WHEEL APPLIQUE TO A WHEEL

(75) Inventor: Ted E. Eikhoff, Grosse Pointe, MI (US)

(73) Assignee: McKechnie Vehicle Components (USA), Inc., Troy, MI (US)

( * ) Notice: Subject to any disclaimer, the term of this patent is extended or adjusted under 35 U.S.C. 154(b) by 0 days.

(21) Appl. No.: 09/658,438

(22) Filed: Sep. 8, 2000

(51) Int. Cl.$^7$ .................................................. B60B 7/06
(52) U.S. Cl. .............................. 29/894.381; 301/37.36; 301/37.43
(58) Field of Search .......................... 301/37.1, 37.31, 301/37.35, 37.36, 37.43; 29/894.38, 894.381

(56) References Cited

U.S. PATENT DOCUMENTS

| | | | |
|---|---|---|---|
| 4,316,637 | * | 2/1982 | Reynolds et al. ............... 301/37.1 |
| 4,530,542 | * | 7/1985 | Spiegel et al. ................. 301/37.1 |
| 5,368,370 | * | 11/1994 | Beam ........................... 301/37.36 |
| 5,664,845 | * | 9/1997 | Maloney et al. ............... 301/37.43 |

\* cited by examiner

*Primary Examiner*—Russell D. Stormer
(74) *Attorney, Agent, or Firm*—Bliss McGlynn, P.C.

(57) ABSTRACT

A wheel applique is secured to a wheel using a method that changes the dimensions of one or both elements during an abutment phase of the method. The method includes the heating of the wheel so that a diameter defined by a rim flange protrusion grows thus providing clearance for the wheel applique to pass by it. Once the wheel applique has passed by the rim flange protrusion, the wheel is cooled to ambient temperature eliminating the clearance and resulting in the wheel applique being locked against the wheel due to the positive engagement of the periphery of the wheel applique and the rim flange protrusion of the wheel.

14 Claims, 3 Drawing Sheets

METHOD FOR SECURING A WHEEL APPLIQUE TO A WHEEL

BACKGROUND OF THE INVENTION

1. Field of the Invention

The invention relates to vehicle wheels of the type having an ornamental wheel applique secured over the wheel for aesthetic purposes. More specifically, the invention relates to a method for securing a wheel applique over the wheel and securing the wheel applique thereto.

2. Description of the Related Art

It is becoming more popular to utilize wheel appliques on vehicle wheels to decorate the external surface thereof to improve the aesthetics of plain steel wheels or any other type of wheel. It is less expensive to place wheel appliques over wheels, as compared to the forming and finishing of the wheels.

One example of a wheel assembly with such a wheel applique is illustrated in U.S. Pat. No. 5,368,370 issued Nov. 29, 1994 in the name of Beam, and assigned to the assignee of the invention. The wheel applique is locked under the rim flange of the vehicle wheel to secure the wheel applique to the vehicle wheel. The periphery of the wheel applique is snapped under the rim flange of the vehicle wheel to lock the wheel applique thereto.

U.S. Pat. No. 5,597,213, issued on Jan. 28, 1997 in the name of Chase, and assigned to Lacks Industries, Inc., discloses a wheel applique that is secured to an outboard surface of a wheel using adhesive. Because the wheel applique and the wheel do not change dimensions through the mounting procedure, clearance must be provided between the rim flange and the periphery of the wheel applique so that the inboard surface of the wheel applique can abut the outboard surface of the wheel. The gap presents a break in the continuity of the design and provides an area where contaminants may collect. This is undesirable aesthetically and functionally as the contaminants may weaken the adhesive allowing the wheel applique to be dislodged from the wheel.

U.S. Pat. No. 3,726,566 issued Apr. 10, 1973 illustrates a wheel applique which includes lips which circumferentially extend about the entire periphery of the wheel applique and rim. German Patent DE 28 13 412 discloses a wheel applique with the edges thereof profiled to grip into fitting grooves.

There are general requirements for any wheel assembly having a permanent ornamental surface treatment. There should be access to the lug nuts. Tire mounting/demounting machinery should be able to operate without damaging the ornamental surface treatment. The wheel assembly should be capable of receiving the standard clip-on balance weights at the rim flanges. There can be no loose components which would cause vibration and noise. The ornamental surface treatment should be secured so that it will not become accidentally disassembled or stolen. The wheel assembly should be durable so that it will not rust or corrode. And finally, the permanent ornamental surface treatment should be economical relative to other prior art surface treatments and ornamentation

SUMMARY OF THE INVENTION

A method is disclosed for making a vehicle wheel assembly having an ornamental surface treatment. The method includes providing a vehicle wheel having an annular rim, a rim flange, a rim flange protrusion and a spider. The spider is concentrically fixed within the rim for connecting the vehicle wheel to a rotating hub. A wheel applique is formed having an inboard surface, an outboard surface and periphery to be disposed adjacent the rim flange. The vehicle wheel is heated to a temperature allowing the rim flange protrusion to expand to a diameter greater than the periphery of the wheel applique. The inboard surface of the wheel applique is abutted against the spider of the vehicle wheel coaxially therewith. The vehicle wheel is then cooled such that the outboard surface of the wheel applique disposed adjacent the periphery abuts the rim flange protrusion locking the wheel applique to the vehicle wheel.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
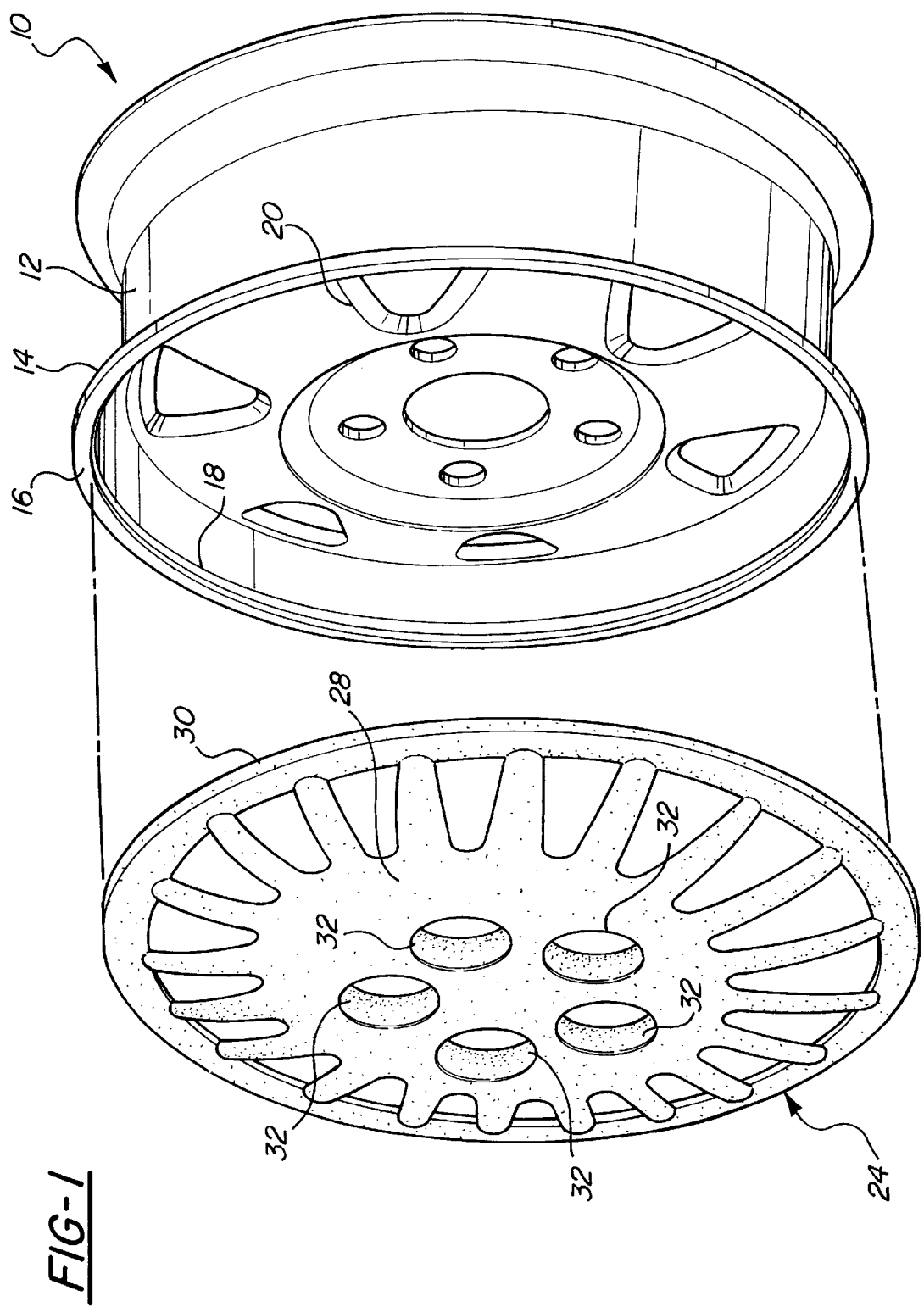
FIG. 1 is an exploded perspective view of one embodiment of the invention.
Figure 2:
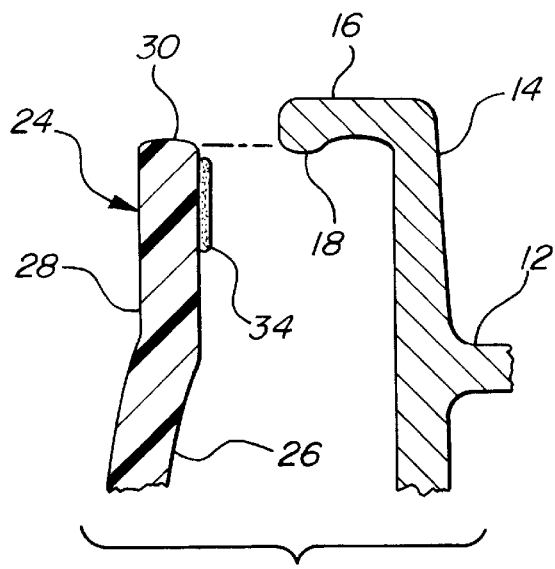
FIGS. 2 through 5 are cross-sectional side views, partially cut away, of a wheel applique being mounted to a vehicle wheel using the inventive method.
Figure 3:
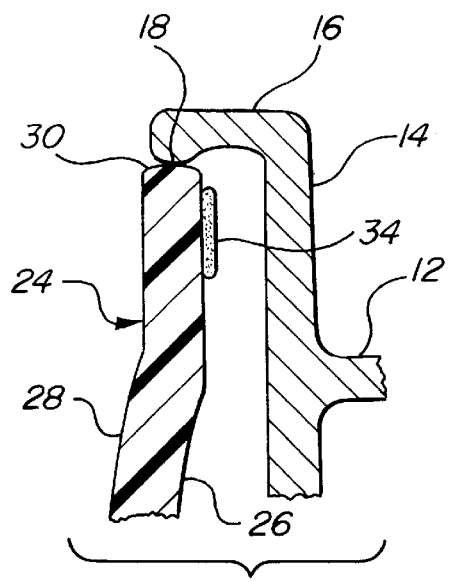
Figure 4:
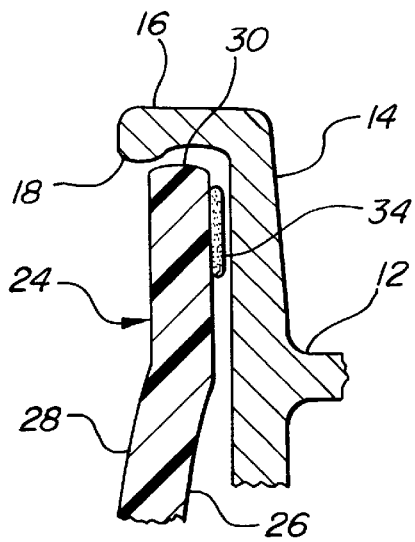
Figure 5:
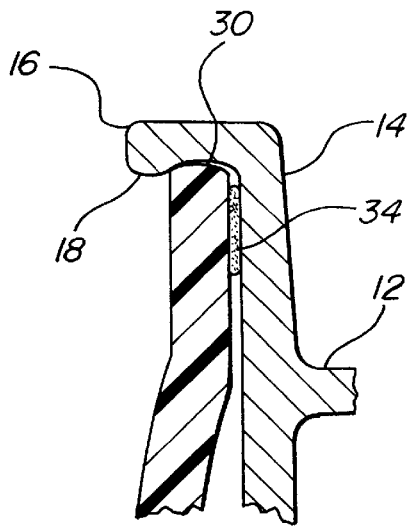
Figure 6:
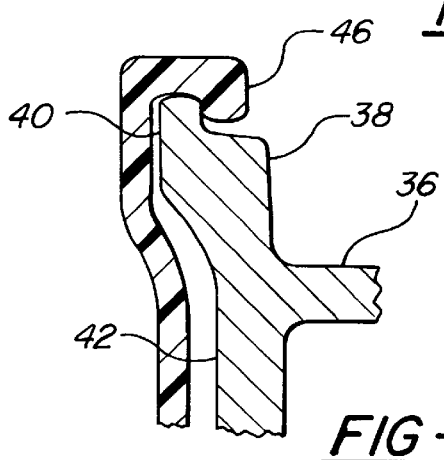
FIG. 6 is an alternative wheel applique/wheel profile incorporating an alternative inventive method.

Referring to the Figures, a vehicle wheel assembly is generally indicated at 10. The vehicle wheel assembly 10 includes a wheel 12. The wheel 12 includes an annular rim 14, a rim flange 16 and a rim flange protrusion 18. In the preferred embodiment shown in FIGS. 1 through 5, the rim flange protrusion 18 extends downwardly from the rim flange 16 generally perpendicularly thereto.

A spider 20 is defined by the rim flange 16. The spider 20 is concentric with the rim flange 16. The spider 20 may be solid or, depending on design choices and cooling requirements, may include vent openings. The spider 20 connects the vehicle wheel 12 to a wheel hub (not shown). Lug nuts (not shown) secure the wheel 12 to the wheel hub.

The vehicle wheel assembly 10 further includes a wheel applique, generally indicated at 24. The wheel applique 24, i.e., a wheel cover, center cap or some other ornamentation defines an inboard surface 26, an outboard surface 28 and a periphery 30 disposed between the two surfaces 26, 28. The outboard surface 28 is treated with a coating for a desired look. The coating is an aesthetic coating and may include paint, chrome and the like.

The inboard surface 26 is a utilitarian surface. It is not coated aesthetically as it is not visible once mounted to the vehicle wheel 12. Like the inboard surface 26, the periphery 30 is not visible when the wheel applique 24 is mounted to the vehicle wheel 12. Therefore, it is not necessary for the periphery 30 to be treated with an aesthetic coating and/or treatment.

The wheel applique 24 includes lug nut openings 32. The lug nut openings 32 provide access to the lug nuts should the wheel 12 be mounted or removed from the wheel hub. Like the spider 20 of the wheel 12, the wheel applique 24 may have openings between its axis and its periphery 30 for functional purposes, i.e., brake venting, or for aesthetic purposes.

Figure 7:
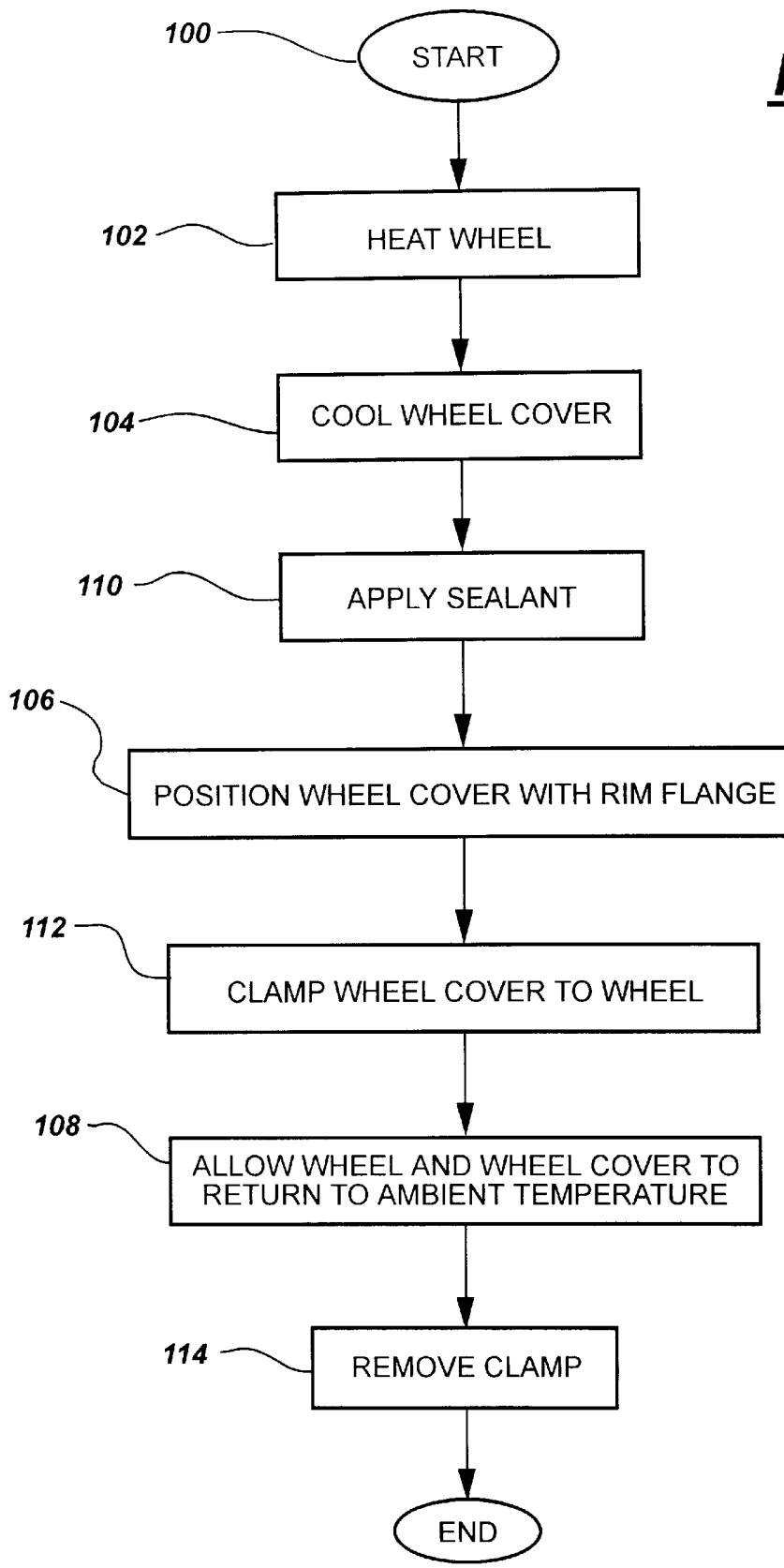
FIG. 7 is a flow chart of the steps of one embodiment of the inventive method.

The inventive method, shown in FIG. 7, is the mounting of the wheel applique 24 to the vehicle wheel 12. The method begins at 100 with providing the wheel 12 to which the wheel applique 24 is to be mounted. The wheel applique 24 is then formed. The wheel applique 24 is formed having a wheel applique diameter of a predetermined length.

The next step, 102, in the method is heating the wheel 12 to a temperature allowing the rim flange protrusion 18 to expand to a protrusion diameter greater than the periphery 30 of the wheel applique 24. This step creates a temperature differential between the wheel 12 and the wheel applique 24. The wheel 12 is heated to a temperature allowing the the rim flange protrusion 18 to expand $50/1000$ ths of an inch. This increase in diameter for the rim flange protrusion 18 is sufficient for the method to be performed. For such an expansion of the wheel 12 to occur, the wheel 12 is heated to approximately 250° F.

While the wheel 12 is being heated, the wheel applique 24 may also be cooled at 104. This step will enhance the step of creating a temperature differential between the wheel 12 and the wheel applique 24. By way of example, to contract the diameter of the wheel applique 24 approximately $30/1000$ ths of an inch, the wheel applique 24 is cooled to 0° F., i.e., it is frozen.

Once the wheel 12 is heated and, if desired, the wheel applique 24 is cooled, the inboard surface 26 of the wheel applique 24 is abutted against the spider 20 of the wheel 12 coaxially therewith at 106. More specifically, the wheel applique 24 is aligned with the wheel 12 while the difference in temperatures therebetween is the greatest.

The temperature differential is then removed by allowing the vehicle wheel 12 to cool such that the outboard surface 28 of the wheel applique 24 disposed adjacent the periphery 30 abuts the rim flange protrusion 18. When the wheel 12 is cooled at 108 and the wheel applique 24 warms to ambient temperature, the interference between the outboard surface 28 and the rim flange protrusion 18 is approximately $40/1000$ ths of an inch. This amount of interference is sufficient to lock the wheel applique 24 to the wheel 12.

A sealant 34 is applied to either the inboard surface 26 of the wheel applique 24 or the spider 20 of the wheel 12 at 110. This step is performed before the inboard surface 26 is aligned with the spider 20. Once the sealant 34 is applied, the wheel applique 24 is abutted against the wheel 12 to seal the space defined thereby against contaminants found in the environment that may corrode the wheel 12 and/or the wheel applique 24.

In some environments of manufacture, a clamp may be required to secure the wheel applique 24 to the wheel 12 before the wheel 12 and the wheel applique 24 return to ambient temperature. This step is performed at 112. Based on the temperatures identified above, a return to ambient temperature, along with a return of the wheel 12 and wheel applique 24 to normal dimensions, occurs within a short period of time from when the wheel 12 and wheel applique 24 are removed from their respective temperature conditioning devices. Finally, the clamp is removed at 114.

In an alternative embodiment, a different profile of a wheel 36 is shown.

This wheel 36 includes what is commonly referred to as a euro-flange 38. The euro-flange 38 includes a rim extension 40 that extends generally in the same direction as the spider 42 thereof. The wheel applique 44 includes a hooked periphery 46 in this embodiment. The hooked periphery 46 abuts and covers the rim extension 40 locking the wheel applique 44 to the wheel 36.

In this embodiment, the method still requires the differentiation of temperature but requires the heating of the wheel applique 44 allowing it to expand so that the hooked periphery 46 may extend beyond the diameter of the rim extension 40. Likewise, the wheel 36 is cooled to contract the diameter thereof to further aid in the hooked periphery 46 passing over the rim extension 40. Upon the return of the wheel 36 and wheel applique 44 to ambient temperature, eliminating the temperature differential, the hooked periphery 46 positively contacts the rim extension 40 locking the two parts 36, 40 together.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A method of making a vehicle wheel assembly having an ornamental surface treatment, the method comprising the steps of:
   providing a vehicle wheel having an annular rim, a rim flange, a rim flange protrusion and a spider concentrically fixed within the rim for connecting the vehicle wheel to a rotating hub;
   forming a wheel applique having an inboard surface, an outboard surface and a periphery to be disposed adjacent the rim flange;
   creating a temperature differential between the vehicle wheel and the wheel applique allowing the rim flange protrusion to expand with respect to the periphery of the wheel applique;
   abutting the inboard surface of the wheel applique against the spider of the vehicle wheel coaxially therewith; and
   removing the temperature differential between the vehicle wheel and the wheel applique such that the outboard surface of the wheel applique disposed adjacent the periphery abuts the rim flange protrusion locking the wheel applique to the vehicle wheel.

2. A method as set forth in claim 1 wherein the step of creating a temperature differential includes the step of heating the vehicle wheel.

3. A method as set forth in claim 2 further including the step of cooling the wheel applique during the step of heating the vehicle wheel to reduce the diameter of the wheel applique.

4. A method as set forth in claim 3 further including the step of returning the wheel applique to ambient temperature during the step of cooling the vehicle wheel.

5. A method as set forth in claim 4 further including applying a sealant to the spider of the vehicle wheel or the inboard surface of the wheel applique prior to the step of abutting.

6. A method as set forth in claim 1 further including the step of clamping the wheel applique to the vehicle wheel while the temperature differential exists.

7. A method of making a vehicle wheel assembly having an ornamental surface treatment, the method comprising the steps of:
   providing a vehicle wheel having an annular rim, a rim flange, a rim flange protrusion and a spider concentrically fixed within the rim for connecting the vehicle wheel to a rotating hub;
   forming a wheel applique having an inboard surface, an outboard surface and periphery to be disposed adjacent the rim flange;

heating the vehicle wheel to a temperature allowing the rim flange protrusion to expand to a diameter greater than the periphery of the wheel applique;

cooling the wheel applique during the step of heating the vehicle wheel to reduce the diameter of the wheel applique;

abutting the inboard surface of the wheel applique against the spider of the vehicle wheel coaxially therewith; and returning the vehicle wheel and the wheel applique to ambient temperature allowing the outboard surface of the wheel applique to abut the rim flange protrusion.

8. A method as set forth in claim 7 further including applying a sealant to the spider of the vehicle wheel or the inboard surface of the wheel applique prior to the step of abutting.

9. A method as set forth in claim 8 further including the step of clamping the wheel applique to the vehicle wheel while the vehicle wheel is cooled.

10. A method of making a vehicle wheel assembly having an ornamental surface treatment, the method comprising the steps of:

providing a vehicle wheel having an annular rim, a rim flange, a rim flange extension and a spider concentrically fixed within the rim for connecting the vehicle wheel to a rotating hub;

forming a wheel applique having an inboard surface, an outboard surface and hooked periphery to cover the rim flange;

cooling the vehicle wheel to a temperature allowing the rim flange protrusion to contract to a diameter less than the hooked periphery of the wheel applique;

abutting the inboard surface of the wheel applique against the spider of the vehicle wheel coaxially therewith; and heating the vehicle wheel such that the outboard surface of the wheel applique disposed adjacent the rim flange extension abuts the hooked periphery of the wheel applique locking the wheel applique to the vehicle wheel.

11. A method as set forth in claim 10 further including the step of heating the wheel applique during the step of cooling the vehicle wheel to increase the diameter of the wheel applique.

12. A method as set forth in claim 11 further including the step of returning the wheel applique to ambient temperature during the step of heating the vehicle wheel.

13. A method as set forth in claim 12 further including applying a sealant to the spider of the vehicle wheel or the inboard surface of the wheel applique prior to the step of abutting.

14. A method as set forth in claim 12 further including the step of clamping the wheel applique to the vehicle wheel while the vehicle wheel is heated.

* * * * *